(12) United States Patent
Beygelzimer et al.

(10) Patent No.: US 7,782,792 B2
(45) Date of Patent: *Aug. 24, 2010

(54) APPARATUS AND METHODS FOR DETERMINING AVAILABILITY AND PERFORMANCE OF ENTITIES PROVIDING SERVICES IN A DISTRIBUTED SYSTEM USING FILTERED SERVICE CONSUMER FEEDBACK

(75) Inventors: Alina Beygelzimer, Pleasantville, NY (US); Irwin Boutboul, Jersey City, NJ (US); Shang Guo, Ossining, NY (US); Herbert M. Lee, New Fairfield, CT (US); Irina Rish, Rye Brook, NY (US); Nianjun Zhou, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/132,886

(22) Filed: Jun. 4, 2008

(65) Prior Publication Data

US 2008/0270225 A1     Oct. 30, 2008

Related U.S. Application Data

(63) Continuation of application No. 11/472,939, filed on Jun. 21, 2006.

(51) Int. Cl.
    *H04L 12/26* (2006.01)
(52) U.S. Cl. ........................ 370/252; 370/236
(58) Field of Classification Search ................ 370/392, 370/328, 252, 236; 709/224
    See application file for complete search history.

(56) References Cited

U.S. PATENT DOCUMENTS

| 6,173,322 | B1 | | 1/2001 | Hu | 709/224 |
| 7,225,250 | B1 | | 5/2007 | Harrop | 709/224 |
| 7,613,126 | B1 | * | 11/2009 | Natarajan et al. | 370/252 |
| 7,680,050 | B1 | * | 3/2010 | Sindhu | 370/236 |
| 2003/0225876 | A1 | * | 12/2003 | Oliver et al. | 709/224 |
| 2004/0064552 | A1 | * | 4/2004 | Chong et al. | 709/224 |

(Continued)

OTHER PUBLICATIONS

"Using Keynote Measurements to Evaluate Content Delivery Networks", http://www.keynote.com/services/html/product_lib.html, 8 pgs.

(Continued)

*Primary Examiner*—Kwang B Yao
*Assistant Examiner*—Syed Bokhari
(74) *Attorney, Agent, or Firm*—Harrington & Smith (57) ABSTRACT

The invention concerns apparatus and methods that determine availability and performance of entities providing services in a distributed system using filtered service-consumer feedback. In particular, apparatus and methods of the invention filter service-consumer feedback in order to reduce the effect of circumstances unique to individual service consumers or to groups of service consumers that do not accurately reflect the actual availability or performance of service-providing entities. In this way an accurate appraisal is gained regarding the performance and availability of a service-providing entity. Reactive methods of the invention can be combined with proactive methods such as, for example, active status probing, to further improve the accuracy of data concerning the status and availability of service-providing entities.

20 Claims, 6 Drawing Sheets

U.S. PATENT DOCUMENTS

| | | | |
|---|---|---|---|
| 2005/0081082 A1 | 4/2005 | Brodie et al. | 714/4 |
| 2005/0235057 A1* | 10/2005 | Brodie et al. | 709/224 |
| 2007/0030823 A1* | 2/2007 | Guo et al. | 370/328 |
| 2009/0034527 A1* | 2/2009 | Mathieu et al. | 370/392 |

OTHER PUBLICATIONS

"Real-time Problem Determination in Distributed Systems using Active Probing", Irina Rish et al., In Proceedings of NOMS-2004, Apr. 2004, 14 pgs.

"Pattern Classification and Scene Analysis-Chapter 1", Richard O. Duda et al., John Wiley & Sons(1973), Mitchell, Tom M. (1997), Machine Learning, New York: McGraw-Hill, 9 pgs.

"Obtaining Calibrated Probability Estimates From Decision Trees and Naïve Bayesian Classifiers", Bianca Zadrozny et al., In Proceedings of the Eighteenth International Conference on Machine Learning, 2001, 8 pgs.

* cited by examiner

APPARATUS AND METHODS FOR DETERMINING AVAILABILITY AND PERFORMANCE OF ENTITIES PROVIDING SERVICES IN A DISTRIBUTED SYSTEM USING FILTERED SERVICE CONSUMER FEEDBACK

CROSS REFERENCE TO RELATED APPLICATION

This application is a continuation of copending U.S. patent application Ser. No. 11/472,939 filed Jun. 21, 2006.

TECHNICAL FIELD

The present invention generally concerns management of distributed and autonomic computing systems, and more specifically concerns real-time diagnosis of faults and performance degradations in distributed systems and networks, particularly peer-to-peer and grid computing systems with highly-unreliable components.

BACKGROUND

Timely detection of performance degradations and/or unavailability of service providers is crucial to providing high quality of service (QoS) in distributed systems, particularly in very large-scale ones, such as computational grids and data grids. This becomes especially important when service providers are unreliable peers in peer-to-peer or grid systems, where the peers can join and leave the system at arbitrary points in time. Directly measuring the performance/availability of each peer on a regular basis can be quite costly, or even impossible, in very large-scale and highly-dynamic systems. Clearly, such a proactive approach would not scale with the size of a system.

Nonetheless, many distributed applications including peer-to-peer and grid computing systems would function more effectively by detecting the performance/availability and the quality of service provided by service providers. The term "service provider" as used herein refers to, for example, a server providing a service over a network, and not to a general IP carrier network. The purpose of detection is to allow adjustments in use of infrastructure to assure performance of service providers and to achieve better scalability. Both peer-to-peer and grid computing systems typically operate over unreliable or variable-performance distributed environments. It is well-known that such dynamic behavior in communication channels results from shared use of computation and communication resources, such as bandwidth, communication time, computation CPU time, or disk space.

Two modes can be adopted to determine service status of a service provider accessed over a distributed or networked system—the heretofore-mentioned proactive mode or a reactive mode. In the proactive mode, status information is updated periodically or whenever there is a change. In a reactive mode, status is gathered only when it is needed. Active discovery of status incurs overhead, both in the discovery itself, and in the maintenance of current status information (awareness of the system). But accurate and timely status information is needed to provide better services for clients (or consumers) and to maintain a scalable system. Therefore, a decision has to be made about how often and when to probe or detect the status of service providers, or how to categorize service quality.

Event correlation is a commonly-used approach for problem determination in distributed systems. Event correlation seeks to match event combinations with potential failures in a system. However, this approach assumes the availability of a "codebook" which identifies each problem that may be diagnosed and corresponding event combinations that will accompany an occurrence of the problem. Probing techniques constitute a similar approach for problem diagnosis, where it is assumed that there is a set of possible end-to-end test transactions (probes); a set of system components; and a "dependency matrix" specifying which components each probe examines. The most recent work on active probing provides a considerably more efficient approach (sometimes up to 70% and higher) than codebook and "passive" probing, by actively selecting a next most-informative probe.

However, in many real systems, no dependency information (i.e., no dependency matrix or codebook) is readily available. Accordingly, those skilled in the art seek an alternative for determining availability and performance of service providers in a distributed system. In particular, those skilled in the art seek methods and apparatus that minimize the need for developing a priori a comprehensive understanding or codebook that documents relationships between problems and associated event occurrences; that generally minimize the need for active probing of service provider status; and that use information, where available, to determine availability and performance of service providers in a distributed system.

SUMMARY OF THE PREFERRED EMBODIMENTS

The foregoing and other problems are overcome, and other advantages are realized, in accordance with the following embodiments of the present invention.

A first embodiment of the invention comprises a signal-bearing medium tangibly embodying a program of machine-readable instructions executable by a digital processing apparatus of a computer for determining status of entities providing services in a distributed system. When the digital processing apparatus executes the program of machine-readable instructions operations are performed, the operations comprising: collecting feedback from service consumers concerning the entities providing service in the distributed system; analyzing the feedback collected from the service consumers; and determining the status of entities providing service in the distributed system in dependence on the analysis of the collected feedback.

A second embodiment of the invention comprises apparatus for managing activities of entities providing services in a distributed system. The apparatus comprises: a communications interface for connecting to the distributed system, the communications interface for communicating with service consumers; at least one computer memory; and a digital processing apparatus coupled to the communications interface and the computer memory. The at least one computer memory stores: feedback information collected from service consumers, the feedback information concerning performance of entities providing services in the distributed system; credit information concerning current credit status of entities providing services in the distributed system; a provider list of entities permitted to provide services in the distributed system; and at least one computer program to perform operations for determining status of entities providing services in the distributed system. The computer program determines the status of entities providing service in the distributed system based, at least in part, on analyzing the feedback information collected from service consumers. The digital processing apparatus is operable to execute the at least one computer program.

A third embodiment of the invention comprises a method for determining status of entities providing services in a distributed system, the method comprising: collecting feedback from service consumers concerning the entities providing service in the distributed system; analyzing the feedback collected from the service consumers; and determining the status of entities providing service in the distributed system in dependence on the analysis of the collected feedback.

In conclusion, the foregoing summary of the various embodiments of the present invention is exemplary and non-limiting. For example, one or ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The invention results, in part, from the recognition that although in many real systems no dependency information (i.e., no dependency matrix or codebook) is readily available identifying problems states and related event occurrences, feedback from service consumers regarding a system's performance (e.g., successful or unsuccessful download of a file from a given node) is often available and easy to collect. The approach adopted in the invention differs from the probing and codebook approaches as follows: (1) the key source of information for online inference as practiced in the invention is feedback information concerning actual service usage provided by multiple service consumers (the feedback on both successful and unsuccessful transactions), which eliminates the need for proactive testing; and (2) contrary to conventional practice, the approach is completely independent of any assumptions about the dependency model between system components and probe outcomes, and utilizes statistical information obtained from operational data.

An aspect of this invention reduces costs associated with monitoring and problem diagnosis in large-scale distributed system such as, for example, peer-to-peer or grid computing systems, by efficiently utilizing feedback information about service availability and performance obtained from service consumers. Herein, the cost-efficiency of diagnosis is understood as achieving an optimal trade-off between the diagnostic cost (e.g., the cost of measurements and tests, as well as time to diagnose a problem) versus the diagnostic quality (e.g., diagnostic accuracy). Problem diagnosis in a distributed system is defined as identification of status (e.g., availability and/or performance) of service providers. The status is defined as a random variable with multiple possible discrete values. When there is feedback from a client, information can be gathered about the service provider such as its availability and quality of service.

Unfortunately, the feedback information usually contains some noise. Short interruptions of service or local problems with the service consumer (e.g., network performance problems) will affect the client-based feedback. The presence of noise in the data inevitably leads to diagnostic errors. Thus, an approach is needed that reduces the amount of noise in order to infer the real status of service providers.

In embodiments of the invention, an adaptive, sequential diagnostic approach is used that improves diagnostic accuracy by accumulating feedback information over time while also minimizing the time to diagnose and the number of feedbacks needed to diagnose the status of a service provider. For background information, reference can be had to A. Wald, Sequential Analysis, New York, N.Y., John Wiley & Sons, 1947; and Duda, Hart and Stork, Pattern Classification ($2^{nd}$ ed.), New York, N.Y., John Wiley & Sons 2000.

Feedback information typically contains various metrics (herein called "attributes") collected both about the service provider, such as the availability and the response time for a service, and about the client. For example, combined feedback information can include such attributes as: time of day and/or day of week when the feedback was recorded; service provider's IP address; client's IP address; and time to last successful service request or failed service request from the service provider (e.g. across multiple clients access attempts), and so on.

In the invention information about both the service provider (such as, for example, metrics concerning availability or service response time), and the client, is gathered to help reduce the noise. The collected information will be expressed as a conditional probability distribution of the status of a service provider at a given moment. The condition is the performance feedback and metric values of the client and the service provider. The probability distribution could be calculated with a purely statistical model or, with a model incorporating machine-learning methods (e.g. decision trees). The benefit of selecting a machine-learning method with classification is that the probability of service failure or poor performance can be related to factors such as geographic location of client or service providers, service time or network performance. These factors are difficult to include using only a statistical model:

Time of day/day of the week when the feedback occurred

Service provider's IP address;

Client's IP address; and

Time to last successful service or failed service by the service provider (e.g. across multiple clients access attempts).

Furthermore, in embodiments of the invention, multiple feedbacks about a given service provider are combined to derive a better understanding of the service provider within a given time period. The reason for using this combination is based on the assumption that majority opinion better reflects operational reality. It is assumed that the probability of a service status change for a service provider within a time period is very small, but multiple client requests could occur during that time period. If the feedback from these requests is combined, it would be easier to generate a collective view of the status of the service provider to achieve the goal, thereby creating a credit system which is based on multiple feedbacks. Each service provider has a credit value that is adjusted when there is feedback about the provider. When a new complaint (negative comment) about the service provider arrives, the credit value will drop. When positive feedback arrives, the credit value will increase. When positive feedback arrives, the credit could be restored to its highest possible value, or incremented by a certain value. When the credit value of a service provider drops below a pre-defined threshold, the following options can be performed: 1) remove the service provider involved from the service list; 2) send an alert to the system administrator to check the system; or 3) send an active probe to directly verify the status of the service provider.

In the invention, it is assumed that there are multiple service providers providing the same service. These service providers are distributed over different geographic locations or different subnets of an Internet/Intranet. A client makes a request for service to a well-known management server, which dynamically constructs a list of candidate service providers and returns the list to the client. The client does not have any prior knowledge of service providers in the peer-to-peer or grid computing system.

There will be a centralized feedback system, which could co-reside with the client query system, or be instantiated separately. Every time there is usage of the service, feedback will be sent by the client to the central feedback system. Depending on the embodiment, the feedback could contain simply the availability of the services or, additionally, a numerical quantity expressing the quality of the service, computed as a combination of metrics incorporating both client and service-provider data. There will be an analyzer inside the central feedback system to calculate the credit of each provider. When the credit of a service provider is too low, the provider either will be removed from the service provider list, or an on-demand probe will be sent out to detect the status of the service provider. Based on probe results, appropriate intervention will be initiated, either through manual or automated means.

For learning purposes, labeled training data is required. Label training data reflects the "true" availability status ("label") of the service provider at the time of a feedback. In embodiments of the invention, such labeled data can be obtained by testing the service provider availability from a reliable location such as, for example, a central server, that is assumed to provide noise-free, or nearly noise-free, information about the status of a service provider. Note, however, that such a direct approach cannot be normally used for diagnosis of service providers as probing is costly, and may not even be scalable in large systems with high frequency of service requests and unreliable service providers (e.g. in grid and peer-to-peer computing). Thus, only a limited amount of probing is used to collect labeled training data and learn a classifier, i.e. a function that maps a vector of observed attributes ($A_1, \ldots, A_n$) to an (unobserved) availability status S (e.g. S=0 if service is available, i.e., no problem is present, and S=1 otherwise) of a service provider. Any state-of-art classification approach such as decision tree, Bayesian network classifier, support-vector machine (SVM), neural network, and so on, can be used. Reference in this regard can be had to Duda, Hart and Stork, Pattern Classification ($2^{nd}$ ed).

Once a classifier is learned, it can be used in an online mode to predict the status of the service provider given the measured attributes associated with a client's feedback. The prediction given by classifier is denoted as C (e.g., C=0 means that classifier decided the service provider is up, otherwise C=1). However, as mentioned above, there is an inevitable classification error caused by noise in the feedback data due to other potential problems in the system (either at client's side, or in the network) that may, for example, lead to increased response time and make service provider appear as unavailable. In order to boost classifier's performance and reduce the error, an adaptive sequential decision rule is applied based on a likelihood ratio test: the likelihood ratio L=P0/P1 is computed where P0=P(C|S=0) is the probability of the current classification result given that the true status of a service provider is 0 (available), and P1=P(C|S=1)) is the probability of the current classification result given that the true status of a service provider is 1 (unavailable). Clearly, those probabilities must be initially estimated from training data in the offline phase. There are only two numbers that have to be computed: P00=P(C=0|S=0) and P01=P(C=0|S=1), since P(C=1|S=0)=1−P00, and P(C=1|S=1)=1−P01, as the probabilities of C=0 and C=1 (given same S) must sum to 1.

The sequential diagnosis procedure computes the likelihood ratio Li for each i-th feedback entry, and combines them, assuming feedback independence, into a sequence likelihood as a product SL=L1 x . . . x Lk, where k is the current number of observations. The diagnostic procedure stops when the SL exceeds an upper threshold T_high or falls below a lower threshold T_low, where the thresholds can be set so that desired accuracy levels are achieved (there is a theoretical relationship between the diagnostic error and the threshold levels).

In summary, combining multiple feedbacks obtained within a short time period provides a better knowledge of the true status of a service provider then a single noisy feedback. It is assumed that the probability of service status change for a service provider within a relatively short time period is very small, but there are multiple client requests during that time period in a highly utilized system with high frequency of service requests.

Finally, sequential diagnosis can be further augmented with active probing capability. For background information regarding active probing reference can be had to Rish, Brodie, Odintsova, Ma and Grabarnik, Real-time Problem Determination in Distributed Systems Using Active Probing in Proc. NOMS-2004, Seoul, Korea, April 2004. Namely, if knowing the true status of a service provider appears to be critical, and it is not desirable to wait for additional feedback information, because the diagnostic error may still be sufficiently high; or it is desirable to avoid possible diagnostic error by avoiding inference and testing the status directly, a probe can be sent to the service provider from a reliable location. This has the benefit of obtaining direct information about the service provider, but nonetheless incurs additional costs associated with such action. Active probing does have the benefit of obtaining high diagnostic accuracy. The sequential diagnosis procedure can be updated accordingly to incorporate the probing action, so that at each point, there is a choice of (1) declaring the status of a service provider based on current likelihood ratio; (2) waiting for more feedback information to improve the diagnosis accuracy, or (3) directly test the server provider. Each action has certain cost, and the task of sequential diagnostic method is to minimize the expected cost of diagnosis while achieving high diagnostic accuracy.

Figure 1:
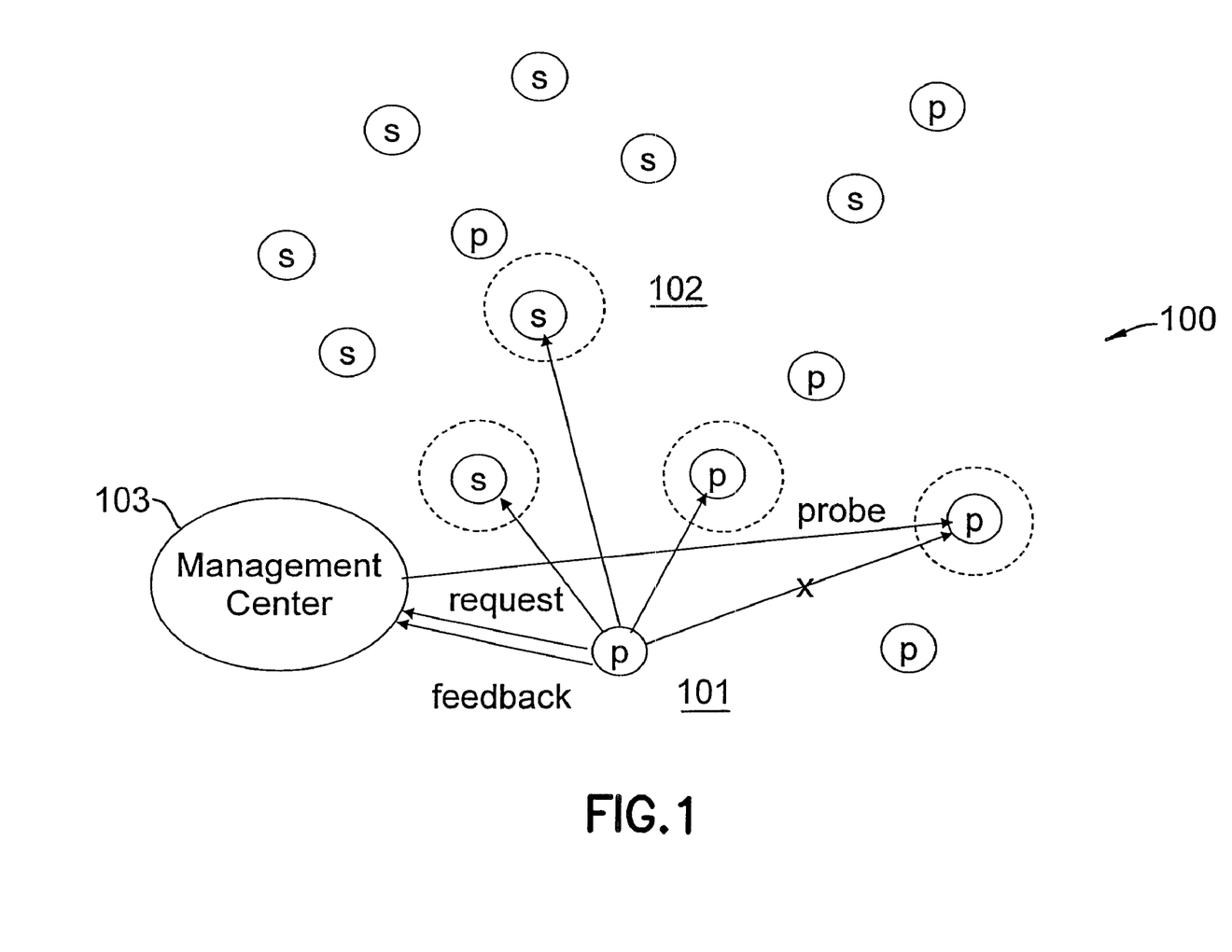
FIG. 1 depicts a system such as, for example, a grid computing system, in which the methods of the invention can be practiced.

FIG. 1 depicts a service-providing distributed system 100, and particularly an example of a grid system, where certain participants (peers) 101 are both service providers and service consumers. In the figure, such nodes are denoted as "p" for peers (101), while other nodes are designated as servers (denoted "s") 102. For example, in data grids, where the main service is providing file downloads, a peer 101 may request a file from another peer 102, but provide it later for some other peer. In computational grids, any peer can be both a client requesting a particular job to be executed, and a server that provides its computational resources (when they are available) to other peers. It is assumed that there are multiple service providers providing the same service, e.g. there are multiple nodes containing the same file. These service providers are distributed over different geographic locations or different subnets of an Internet/Intranet. A client makes a request for service to a server hosting management center 103, which dynamically constructs a list of candidate service providers and returns the list to the client. The client does not have any prior knowledge of service providers in the peer to peer or grid computing system. Once a client receives a list of candidate service providers, it attempts to obtain the desired service (e.g., download a file); both successful and unsuccessful attempts are reported to the centralized feedback system, which can, for example, reside on the central management server 103. The feedback could contain simply the availability of the services or, additionally, a numerical quantity expressing the quality of the service, computed as a combination of metrics incorporating both client and service provider data. Based on the feedback, the central manager can decide whether to double-check the status of a service provider by actively probing the service provider.

Figure 2:
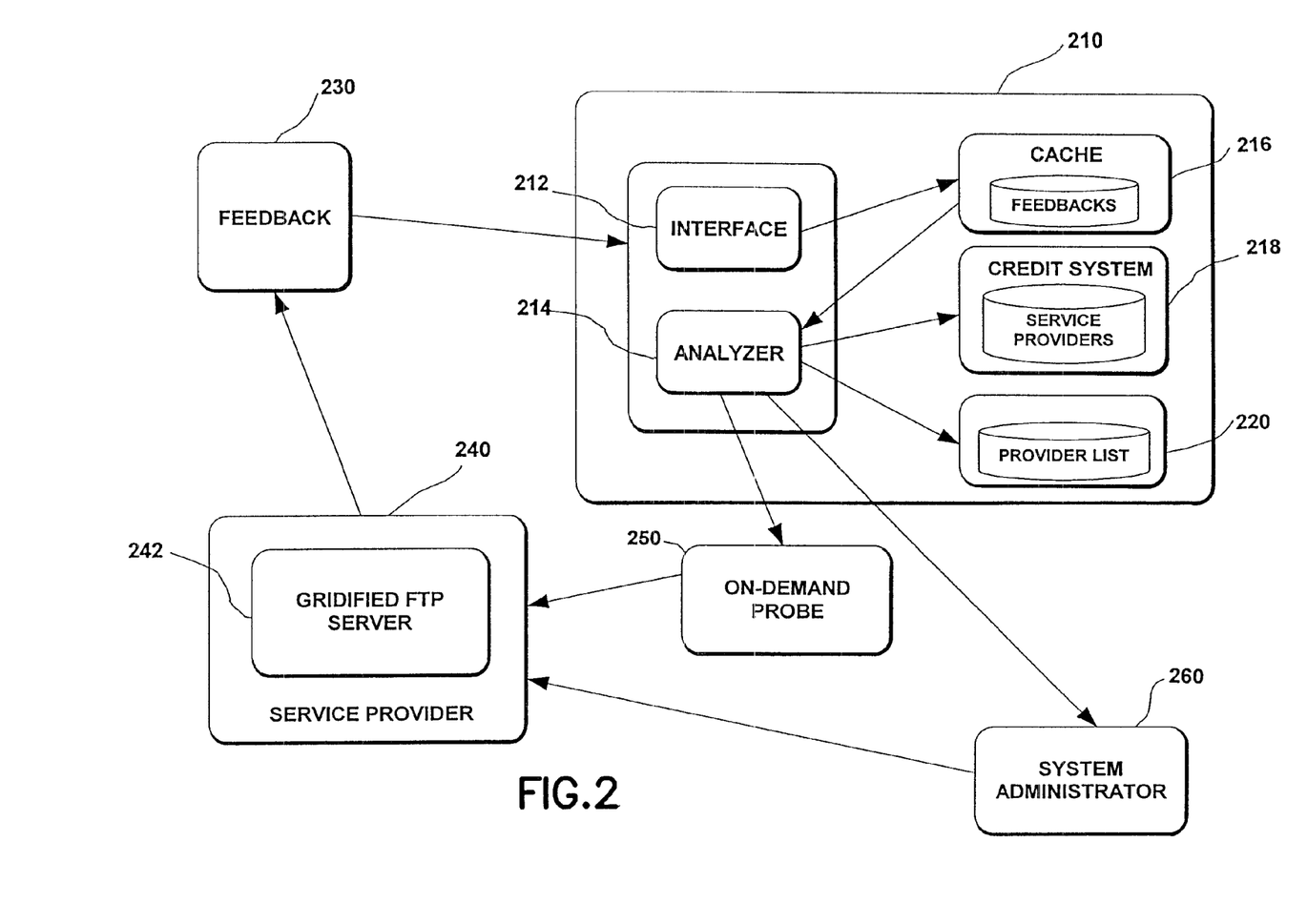
FIG. 2 is a block diagram depicting a client feedback system operating in accordance with the invention.

FIG. 2 is a block diagram depicting a feedback system operating in accordance with the invention. Feedback system 210 comprises an interface 212; an analyzer 214; and memory components cache 216 storing feedback from service customers; credit system 218 storing current credit account values for each entity providing service in the distributed system; and a provider list detailing each entity permitted to provide service in the distributed system. Analyzer 214 typically comprises digital processing apparatus and one or more computer programs for performing methods of the invention when executed. When operating, the feedback system 210 receives feedback 230 (both positive and negative) from service customers receiving services provided by entities in the distributed system. In appropriate circumstances, an on-demand probe 250 is triggered from the central feedback system 201 to detect the status of a specific service provider (such as, for example 240). In other instances a command is sent to system administrator 260 to re-start or repair a service provider. In the system depicted in FIG. 2, entity 240 providing services in the distributed system comprises a gridified FTP server.

Figure 3:
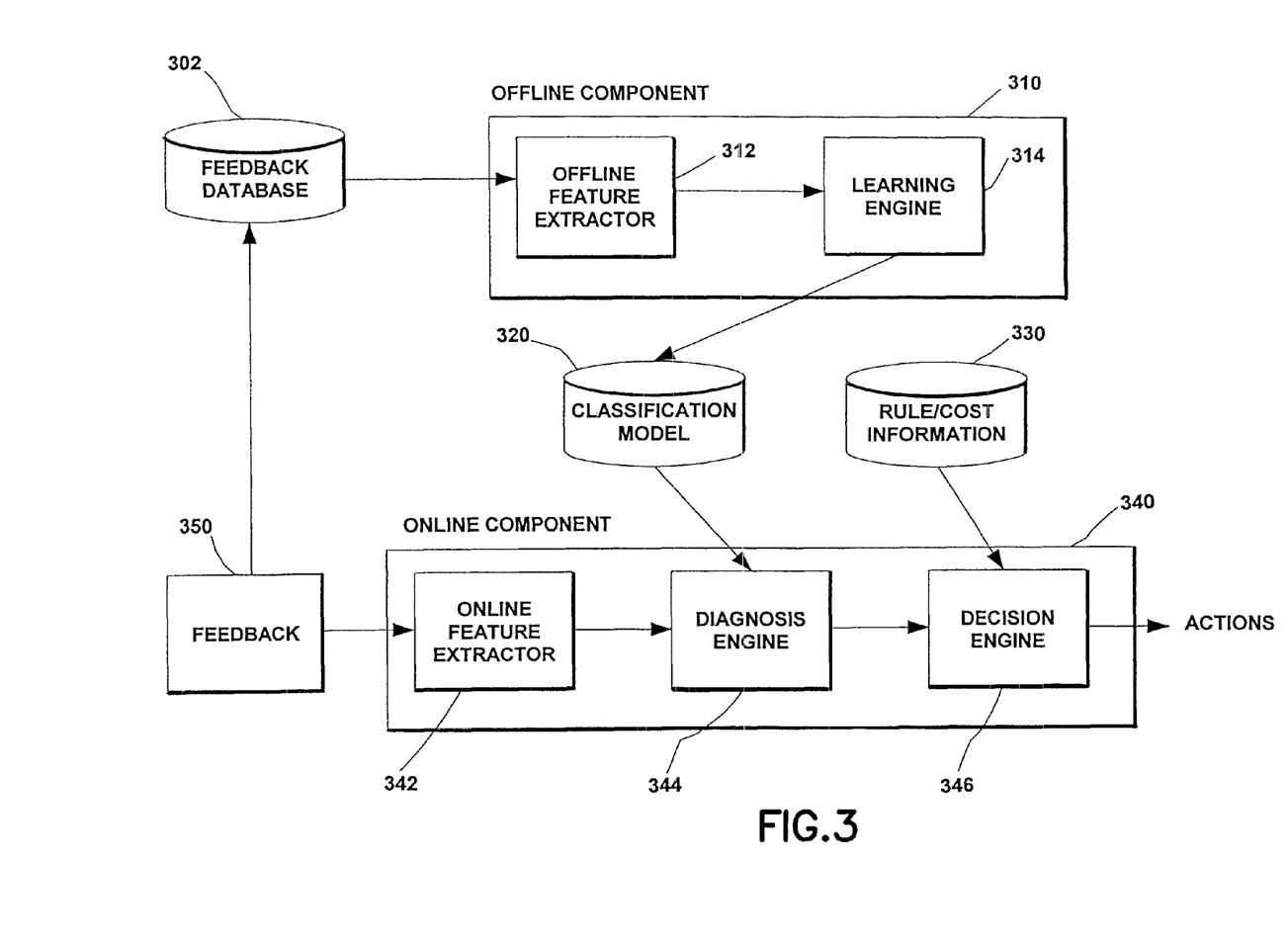
FIG. 3 is a block diagram depicting a client feedback analyzer component operating in accordance with the invention.

FIG. 3 depicts in conceptual form how elements of software comprising, in part, analyzer component 214 interact with feedback 302, 350 at various points in time. The software comprising, in part, analyzer component 214 comprises an offline component 310 and an online component 340. Offline component 310, when executed by digital processing apparatus of analyzer component 214, operates to extract feature information from feedback stored in feedback database 302. Learning engine operates on information derived by offline feature extractor 312 to create a diagnostic model. In the embodiment depicted in FIG. 3, the diagnostic model comprises a classification model 320 indicating various states that entities providing service in the distributed system may assume.

Online component 340 operates in real time to analyze feedback 350 provided by service customers based, at least in part, on classification model 320. Online feature extractor 342 analyzes feedback provided by service customers to determine various categories of information provided by service customers. Diagnosis engine 344 uses classification model 320 to determine the current states of entities providing service in the distributed system. Based on status information identified by diagnosis engine 346, various actions may be taken by decision engine 340. For example, decision engine may decide to order an active probe if rule/cost information 330 permit such an active probe in current circumstances.

Alternatively, if, as a result of determinations made by diagnostic engine 344 it is inferred that an entity is either unavailable, or no longer capable or providing service at a threshold level, then the entity would be removed from provider list 220.

In greater detail, offline feature extractor 342 reads the database configuration; sets the interface connection; reads feature definition, the order of features, the time frame, feature representation and feature file location; and extracts feature data in a pre-determined way and exports the information to the feature file. Learning engine 314 reads classifier type; input feature file location; output model location and builds a model and exports the model file to classification model 320. Classification model 320 identifies and classifies instances. Decision engine 344 operating using classification model, operating on information provided by online feature extractor, infers the current status of entities providing service in the distribute system.

Figure 4:
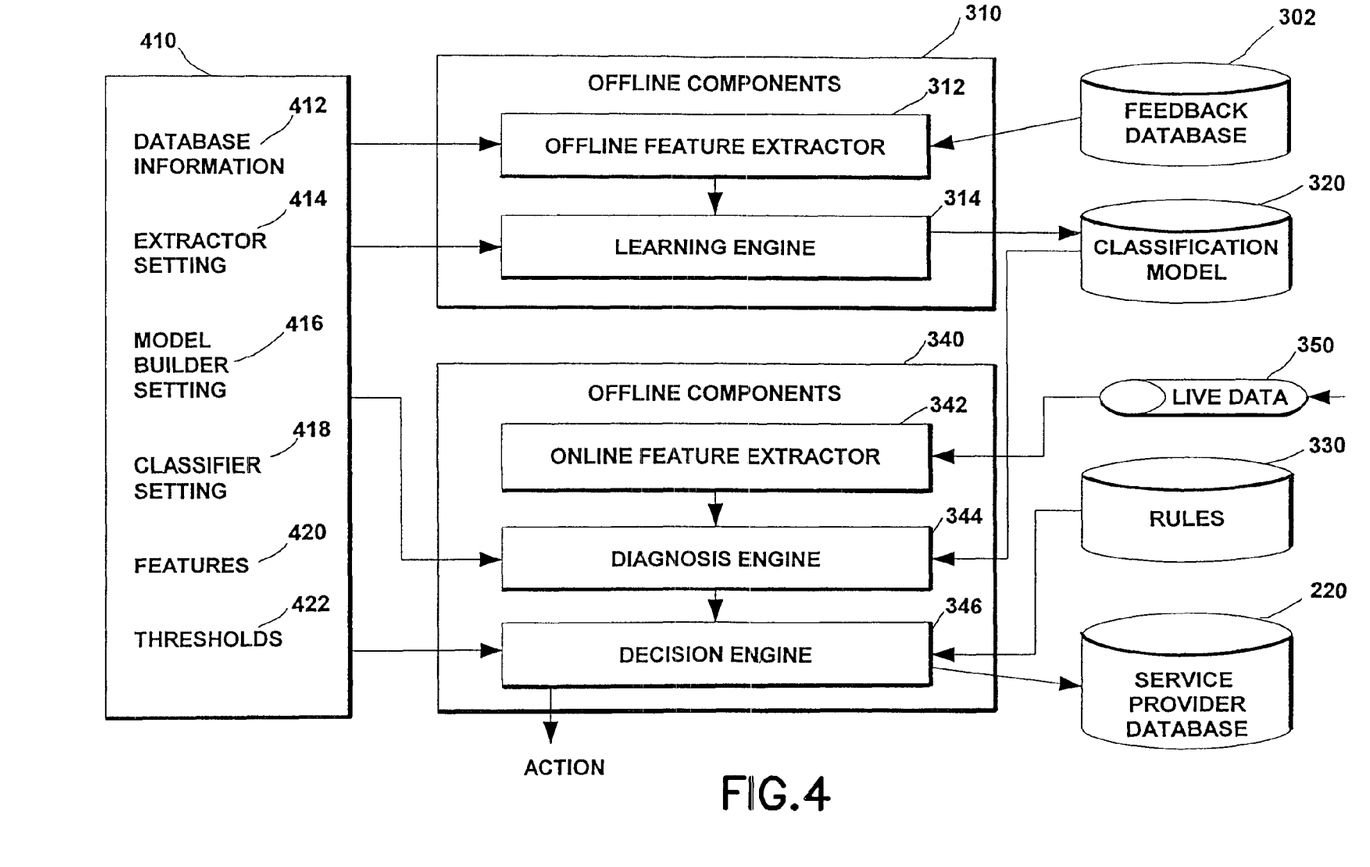
FIG. 4 is a block diagram alternately depicting a client feedback analyzer component operating in accordance with the invention.

FIG. 4 alternately depicts the analyzer component 214 previously depicted in FIG. 3. FIG. 4 depicts categories of information and data 410 that analyzer component draws upon in performing methods in accordance with the invention. The information 410 comprises database information 410; extractor settings 414; model builder settings 416; classifier settings 418; features 420 and thresholds 422.

Figure 5:
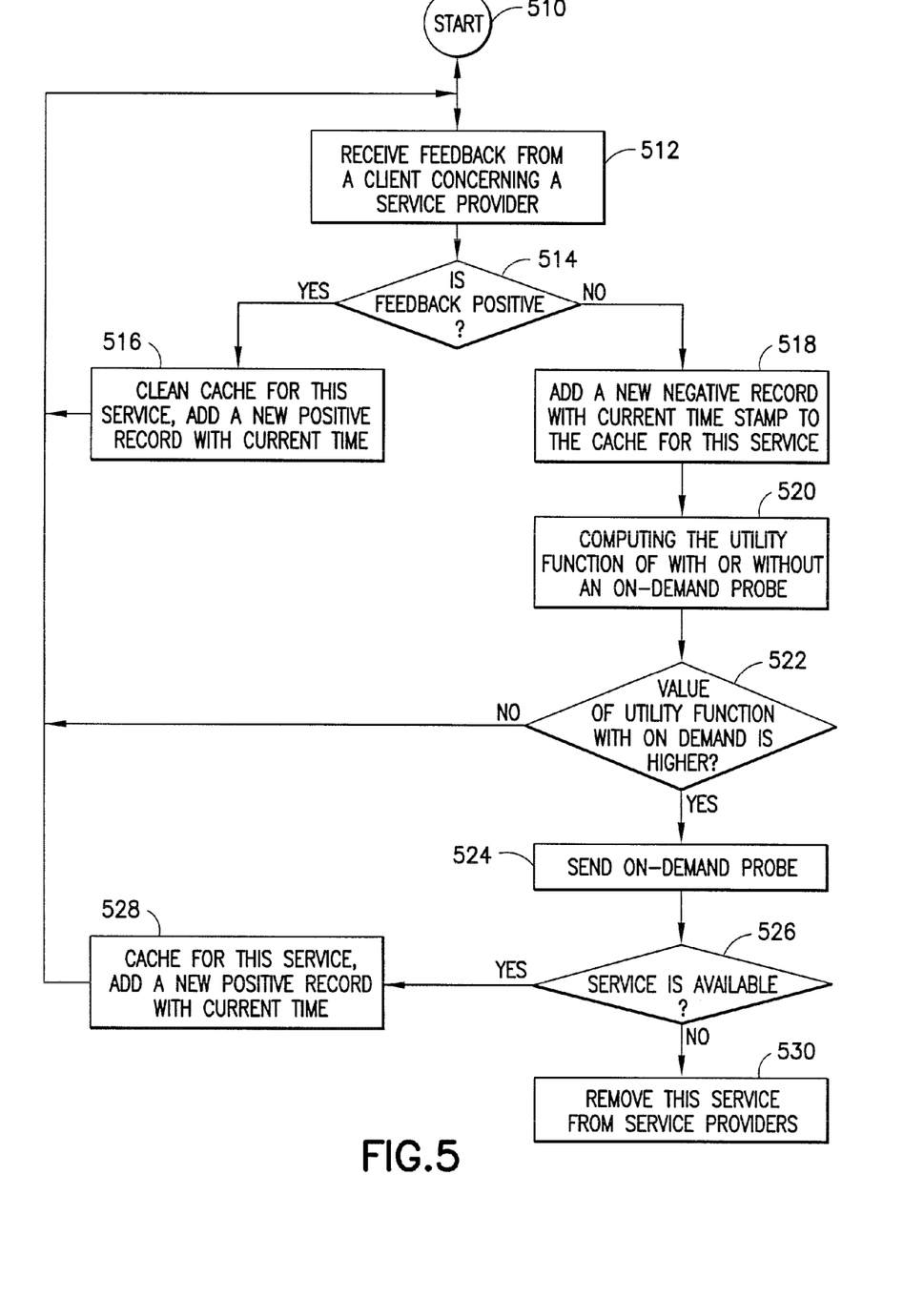
FIG. 5 is a flowchart depicting a method operating in accordance with the invention.

FIG. 5 is a flowchart depicting a method operating in accordance with an embodiment of the invention. The method typically is embodied in machine-readable instructions comprising one or more computer programs. When the one or more computer programs are executed the steps depicted in FIG. 5 are performed. Reference will be made to other figures in explaining FIG. 5. The method starts at 510. Next, feedback from a client concerning a service provider is received at 512. At decision point 514, it is decided whether the feedback is positive or negative. If the feedback is positive, at 516 a cache receiving feedback information is emptied, and the positive feedback is memorialized in a new positive record which may be saved to cache 216 depicted in FIG. 2. If the feedback is negative, a negative record with current time stamp is added to cache 216 at 518.

Then, at step 520 the utility of performing an active probe is determined using a utility function. At decision point 522, it is decided whether in view of the utility calculation it is economically justified to perform an active probe. If not, the method returns to the start 510. If it is economically justifiable to perform an active probe, the active probe is sent at 524. If it is determined from the active probe that notwithstanding the negative feedback the service is actually available, then at decision point 526 an affirmative outcome results, and new, positive feedback is generated, time-stamped and stored to cache 216. If the service is not available, the entity providing the service is removed from the service providers' list 220.

Figure 6:
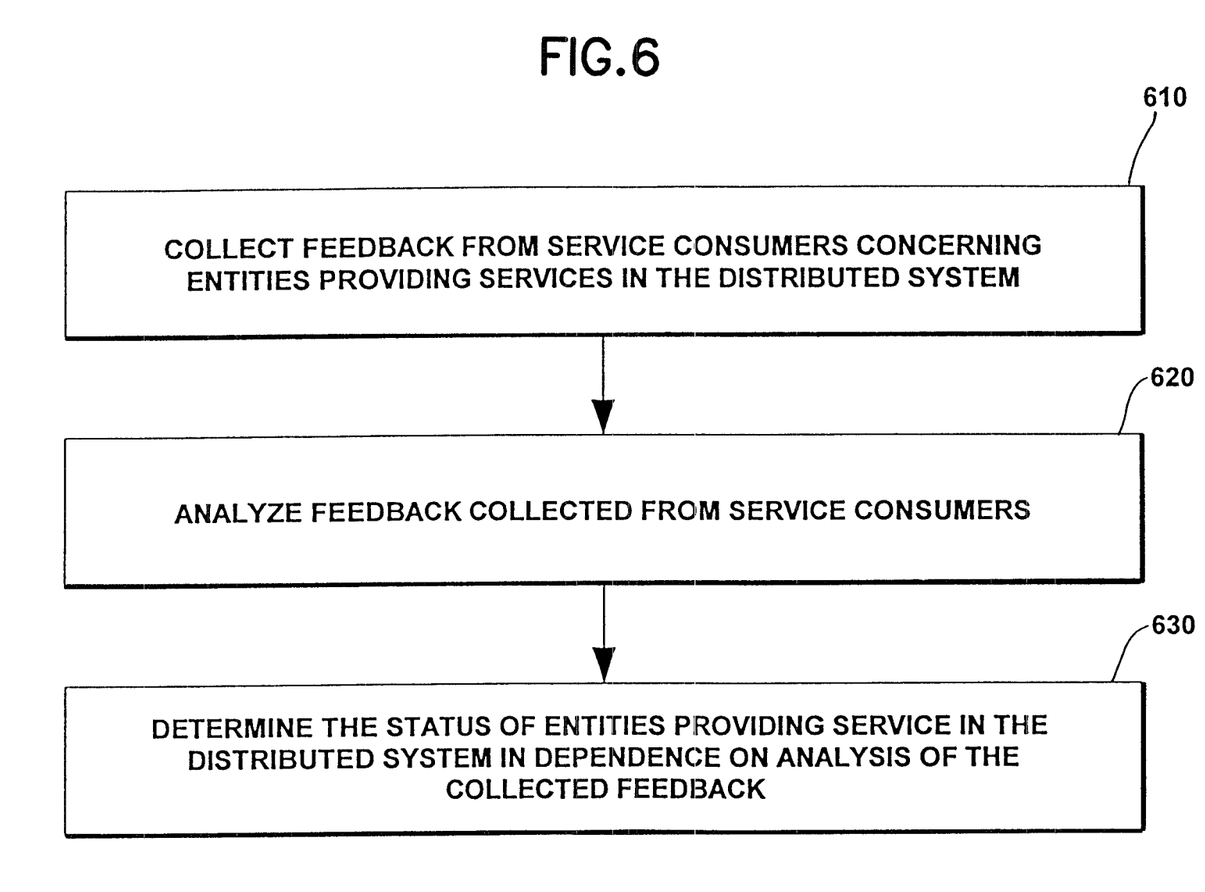
FIG. 6 is a flowchart depicting a method operating in accordance with the invention.

FIG. 6 depicts an alternate method operating in accordance with the invention. As in the case of the method depicted in FIG. 5, the method of FIG. 6 typically will be embodied in machine-readable instructions comprising one or more computer programs. When the one or more computer programs are executed the steps depicted in FIG. 6 are performed. Reference will be made to other figures in explaining FIG. 6. At step 610, digital processing apparatus of central feedback system 210 performs operations to collect feedback from service consumers concerning entities providing services in the distributed system. Next, at 620, the digital processing apparatus performs operations to analyze feedback collected from the service consumers. Then, at 630, the digital processing apparatus determines the status of entities providing service in the distributed system in dependence on analysis of the collected feedback.

In a variant of the method depicted in FIG. 6, additional steps are performed. In a first additional step, credit accounts are maintained in credit system 218 for each entity providing services in the distributed system. When positive feedback is received from service consumers consuming services provided by an entity in the distributed system, the entity's credit account is increased reflecting the positive feedback. When negative feedback is received from service consumers consuming services provided by an entity in the distributed system, the entity's credit account is debited reflecting the negative feedback.

In another variant of FIG. 6 additional steps are performed. If it is determined that as a result of the debiting of an entity's credit account, that a current value of the entity's credit account has fallen below a pre-determined threshold, the entity is removed from provider list 220.

In a further variant of FIG. 6 additional steps are performed. If it is determined that as a result of the debiting of an entity's credit account, that a current value of the entity's credit account has fallen below a pre-determined threshold, the digital processing apparatus sends a command to probe system 250 to perform an active probe of the service provider 240. If it is determined that the service-providing entity is available to provided service, or is capable of providing service at a pre-determined quality of service, the credit account of the service-providing entity is adjusted to reflect this information. If the service-providing entity has been removed from provider list 220, the service-providing entity is added back to provider list 220.

In yet another variant of the method depicted in FIG. 6 additional steps are performed. In a first step, a diagnostic model is formulated using collected feedback information retrieved from cache 216. When a diagnostic model is available, determining the status of entities providing service in the distributed system further comprises: using the diagnostic model and the analysis of the collected feedback to determine the status of entities providing service in the distributed system.

In a still further variant of the method depicted in FIG. 6 additional steps are performed. In a first step an active probe is used to gather actual performance information concerning the actual performance of one or more entities providing services in the distributed system. Then, the diagnostic model is adjusted using the actual performance information.

In yet another variant of the method depicted in FIG. 6, the diagnostic model formulated using collected feedback information comprises at least a classification model 320 indicating various states that entities providing service in the distributed system may assume.

In a still further variant of the method depicted in FIG. 6, collecting feedback from service consumers concerning entities providing services in the distributed system further comprises: receiving in real time feedback information concerning status of an entity providing service in the distributed system. The step of analyzing feedback collected from service consumers further comprises analyzing the feedback in real time. The step of determining the status of entities providing service in the distributed system further comprises using a classification model 320 and the analyzed real-time feedback information to determine a current status of an entity providing services in the distributed system.

Thus it is seen that the foregoing description has provided by way of exemplary and non-limiting examples a full and informative description of the best method and apparatus presently contemplated by the inventors for determining availability and performance of entities providing service in a distributed system using filtered service consumer feedback One skilled in the art will appreciate that the various embodiments described herein can be practiced individually; in combination with one or more other embodiments described herein; or in combination with distributed systems or grid computing systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A non-transitory memory tangibly embodying a program of machine-readable instructions executable by a digital processing apparatus of a computer to perform operations for determining a status of service providers providing services in a distributed system, the operations comprising: collecting feedback from service consumers comprising attributes indicating positive and negative feedback concerning at least an availability of services requested from the service providers by the service consumers over the distributed system; analyzing the feedback collected from the service consumers; and determining a status of service providers providing services in the distributed system in dependence on the analysis of the collected feedback, wherein a classification model is used to classify the status of the service providers providing services in the distributed system, wherein in order to reduce feedback error the classification model applies an adaptive sequential decision rule based on a likelihood ratio $L=P0/P1$, wherein P is a probability, wherein $P=P(C|S=0)$ is a probability of a current classification result of a service provider given that a true status of a service provider is 0 (available), wherein $P1=P(C|S=1)$) is a probability of a current classification result given that a true status of a service provider is 1 (unavailable), wherein C is a classifier that maps a vector of observed attributes, and wherein S is an availability status.

2. The memory of claim 1 wherein the operations further comprise:
   maintaining a credit account for each service provider providing services in the distributed system;
   adding to a service provider's credit account when positive feedback is received from service consumers consuming services provided by the service provider; and
   subtracting from a service provider's credit account when negative feedback is received from service consumers consuming services provided by the service provider.

3. The memory of claim 2 wherein the operations further comprise:
   when a service provider's credit account falls below a predetermined threshold, removing the service provider from a list of service providers authorized to provide services in the distributed system.

4. The memory of claim 2 wherein the operations further comprise:
   when a service provider's credit account falls below a predetermined threshold, sending a probe to actively determine status of the service provider.

5. The memory of claim 4 wherein the operations further comprise:
   when it is determined that the status of the service provider has risen above the predetermined threshold, returning the service provider to a list of service providers permitted to provide services in the distributed system.

6. The memory of claim 1 wherein the operations further comprise:
   formulating a diagnostic model using collected feedback information concerning past performance of service providers providing service in the distributed system; and
   wherein determining the status of service providers providing service in the distributed system further comprises:

using the diagnostic model and the analysis of the collected feedback to determine the status of service providers providing service in the distributed system.

7. The memory of claim 6 wherein the operations further comprise:
using an active probe to gather actual performance information concerning actual performance of an service provider providing service in the distributed system; and
adjusting the diagnostic model in view of the actual performance information.

8. The memory of claim 1 wherein the distributed system comprises a grid computing system.

9. An apparatus for managing activities of service providers providing services in a distributed system, the apparatus comprising: a communications interface for connecting to the distributed system, the communications interface for communicating with service consumers; at least one computer readable memory, the computer readable memory storing: feedback information collected from service consumers, the feedback information comprising attributes indicating positive and negative feedback concerning at least an availability of services requested from the service providers by the service consumers over the distributed system; credit information concerning current credit status of service providers providing services in the distributed system; and a provider list of service providers permitted to provide services in the distributed system; and a digital processing apparatus configured to determine a status of service providers providing services in the distributed system based, at least in part, on analyzing the feedback information collected from service consumers, wherein a classification model is used to classify the status of the service providers providing services in the distributed system, wherein in order to reduce feedback error the classification model applies an adaptive sequential decision rule based on a likelihood ratio L=P0/P1, wherein P is a probability, wherein P0=P(C|S=0) is a probability of a current classification result of a service provider given that a true status of a service provider is 0 (available), wherein P1=P(C|S=1)) is a probability of a current classification result given that a true status of a service provider is 1 (unavailable), wherein C is a classifier that maps a vector of observed attributes, and wherein S is an availability status.

10. The apparatus of claim 9 in which the digital processing apparatus is further configured to access the at least one computer readable memory to retrieve the feedback information, wherein the feedback information further comprises past performance of service providers providing service in the distributed system; and
formulate a diagnostic model using the feedback information.

11. The apparatus of claim 9 wherein the classification model is used to classify the status of the service providers providing services in the distributed system in dependence on feedback received from service consumers.

12. The apparatus of claim 11 wherein the digital processing apparatus is further configured to:
receive in real time feedback information concerning status of a service provider providing service in the distributed system;
analyze the real-time feedback information; and
use the classification model and the analyzed real-time feedback information to determine a current status of the service provider providing service in the distributed system.

13. The apparatus of claim 12 wherein the feedback is negative, and wherein the service provider has a credit account contained in the credit information stored in the at least one memory, the digital processing apparatus is further configured to:
debit the credit account associated with the service provider providing service in the distributed system.

14. The apparatus of claim 13 wherein the digital processing apparatus is further configured to:
after debiting the credit account associated with the service provider providing service in the distributed system, compare a current value of the credit account with a threshold value; and
if it is determined that the current value of the credit account is less than the threshold value, remove the service provider associated with the credit account from the provider list stored in the at least one memory.

15. The apparatus of claim 14 further comprising:
an active probe system for actively probing status of service providers providing service in the distributed system.

16. The apparatus of claim 15 wherein the digital processing apparatus is further configured to:
after debiting the credit account associated with the service provider providing service in the distributed system, compare a current value of the credit account with a threshold value;
if it is determined that the current value of the credit account is less than the threshold value, issue an active probe of the service provider associated with the credit account, the active probe determining an actual status of the service provider; and
adjust the current value.

17. A method for determining status of service providers providing services in a distributed system, the method comprising: at a non-transitory computer readable memory collecting feedback from service consumers comprising attributes indicating positive and negative feedback concerning at least an availability of services requested from the service providers by the service consumers over the distributed system; at least one processor analyzing the feedback collected from the service consumers; and the at least one processor determining a status of service providers providing services in the distributed system in dependence on the analysis of the collected feedback, wherein a classification model is used to classify the status of the service providers providing services in the distributed system, wherein in order to reduce feedback error the classification model applies an adaptive sequential decision rule based on a likelihood ratio L=P0/P1, wherein P is a probability, wherein P0=P(C|S=0) is a probability of a current classification result of a service provider given that a true status of a service provider is 0 (available), wherein P1=P(C|S=1)) is a probability of a current classification result given that a true status of a service provider is 1 (unavailable), wherein C is a classifier that maps a vector of observed attributes, and wherein S is an availability status.

18. The method of claim 17 wherein the status concerns at least the availability of a service provider providing service in the distributed system.

19. The method of claim 17 wherein the status concerns at least the performance of a service provider providing service in the distributed system.

20. The method of claim 17 wherein the feedback information comprises numeric metric information quantifying aspects of an service provider's performance.

* * * * *